Wadleigh & Morrill,
Gage Lathe.

N° 32,931. Patented July 30, 1861.

Witnesses.

Inventors
W. Wadleigh
N. F. Morrill
per Munn & Co
Attorneys

UNITED STATES PATENT OFFICE.

W. WADLEIGH AND N. F. MORRILL, OF SANBORNTON BRIDGE, NEW HAMPSHIRE.

MACHINE FOR TURNING TAPERING FORMS.

Specification of Letters Patent No. 32,931, dated July 30, 1861.

*To all whom it may concern:*

Be it known that we, WARREN WADLEIGH and NATHANIEL F. MORRILL, both of Sanbornton Bridge, in the county of Belknap and State of New Hampshire, have invented a new and useful Improvement in Machinery for Turning Taper or Swelled Forms; and we do hereby declare that the following is a full, clear, and exact description of the same, reference being had to the accompanying drawings, forming part of this specification, in which—

Figure 1:
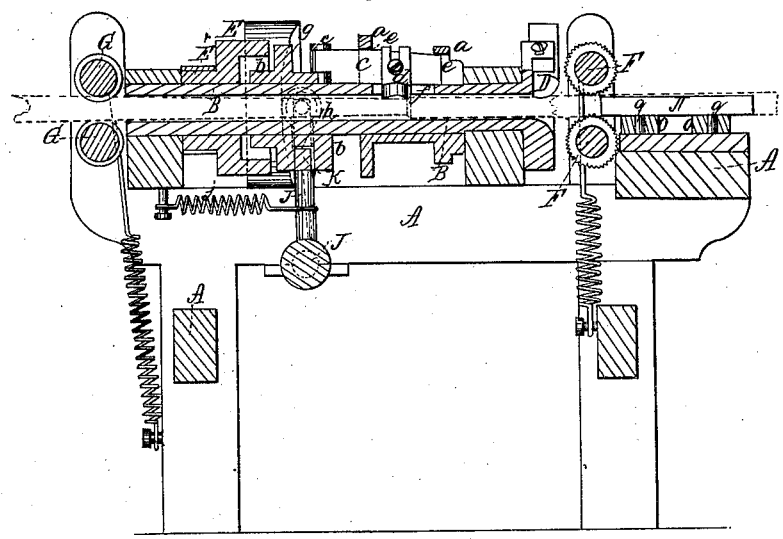
Figure 2:
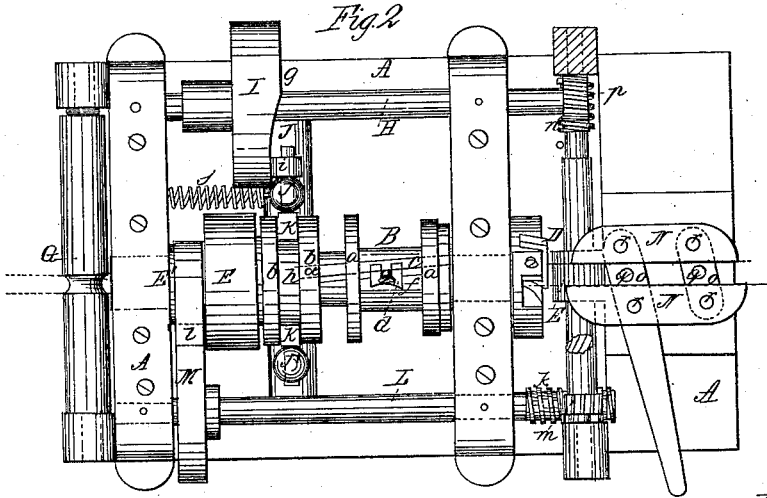

Figure 1, is a central longitudinal section of a machine constructed according to our invention; and Fig. 2, a plan of the same.

Similar letters of reference indicate corresponding parts in both figures.

Our invention relates to machines in which cutters attached to a hollow mandrel revolve around the work, while the latter moves longitudinally through the interior of the mandrel.

It consists in making the cutters adjustable obliquely to the axis of their mandrel, under the control of a pattern-wheel, substantially as hereinafter specified.

To enable others skilled in the art to make and use our invention, we will proceed to describe its construction and operation.

A, is the framing of the machine.

B, is the hollow-cutter mandrel, arranged horizontally in suitable bearings, furnished with two fast collars, $a\ a$, a loose collar, $b$, and two pulleys, E and $E^1$.

D, is a cutter for taking off the rough of the stick, secured firmly to the mandrel near the front end thereof.

C, is a slide to which the finishing cutter, $d$, which also produces the taper or swelled form, is attached. This slide is pivoted at one end by a pin, $c$, to the loose collar $b$, and fitted to slide through guide-slots, $e\ e$, in the fast collars $a\ a$, and through a groove in the exterior of the body of the mandrel. The slide has a double obliquity to the mandrel, that is to say, it is not only oblique to the axis, as shown in Fig. 1, but oblique to all planes passing through the axis, as shown in Fig. 2; the two obliquities being so proportioned to each other as to keep the edge of the cutter $d$ in proper position for cutting, throughout the whole range of the longitudinal movement of the slide C in the guides provided for it.

$f$, is the slot in the mandrel through which the cutter $d$ works.

F F, are the feed-rollers, arranged in front of the mandrel; and G G, are a pair of rollers arranged in rear of the mandrel to receive the work therefrom and prevent it from turning after it has passed the feed-rollers.

H, is a shaft arranged in suitable fixed bearings parallel with the mandrel B; and on one side thereof and carrying the pattern-wheel, I, the edge, $g$, of whose rim constitutes the pattern.

J, is a rock-shaft arranged below and transversely to the cutter-mandrel in suitable bearings, having two arms, $J^1\ J^1$, to which are pivoted the extremities of a bow, K, which fits into a groove, $h$, in the loose collar $b$ of the mandrel; and to one end of the said bow there is fitted an anti-friction roller, $i$, which is kept in contact with the pattern $g$ by means of a spring, $j$, connecting one of the arms $J^1\ J^1$ with the framing. The rotary motion of the shaft H causes the pattern so to act upon the roller $i$ as to produce a movement of the loose collar $b$, and the cutter-slide along the mandrel, either continuously or intermittently, thus producing a taper or swelled form by the cutter $d$ approaching or receding from the axis of the stick, the swell or taper being greater or less according as the velocity at which the cutter slide C is moved longitudinally, is greater or less relatively to the velocity at which the stick is fed through the mandrel by the feed rollers; and being regular or irregular or produced only at intervals according as the form of the pattern is regular or irregular. While the cutter $d$ is stationary, the work is of course parallel.

L, is a shaft arranged in fixed bearings on the opposite side of the main shaft to the shaft H, and parallel with the said mandrel and shaft. This shaft is furnished with a pulley, M, and endless screw, $k$, the said pulley receiving and being driven by a band, $l$, from the mandrel, which is driven by a belt running around the main pulley E, and the said endless screw gearing with worm gears, $m\ m$, fast on the feed-roller shafts, and so driving the said rollers. The lower feed-roller shaft is furnished with an endless screw, $n$, which gears with a worm gear, $p$, on the pattern-wheel shaft H, and so drives the pattern-wheel I.

N N, are parallel guides arranged between and in front of the feed-rollers to guide the stick in the center of the mandrel. These guides are attached by pivots, r r, to two parallel levers O O, at equal distances from opposite sides of the fulcra, q q, thereof, the said fulcra being fixed in the framing. One of the said levers is prolonged to form a handle, P, by which to set the guides nearer together or farther apart.

The invention is particularly well adapted for turning rake, broom and mop handles.

What we claim as our invention, and desire to secure by Letters-Patent, is—

The obliquely arranged cutter-slide C, combined with the hollow mandrel B, by means of a movable collar $b$ and two fast collars $a$ $a$, or equivalent guides outside of the mandrel, and controlled by a pattern-wheel I, on a separate shaft L, applied substantially as herein described; the whole operating substantially as herein set forth.

WARREN WADLEIGH.
NATHANIEL F. MORRILL.

Witnesses:
ETHAN COLBY,
BENJAMIN M. COLBY.